United States Patent

Biskeborn et al.

[11] Patent Number: 5,883,770
[45] Date of Patent: Mar. 16, 1999

[54] PARTIAL WIDTH MASS PRODUCED LINEAR TAPE RECORDING HEAD

[75] Inventors: Robert Glenn Biskeborn, Hollister; James Howard Eaton, Morgan Hill, both of Calif.

[73] Assignee: International Business Machines Corporation, Armonk, N.Y.

[21] Appl. No.: 896,356

[22] Filed: Jul. 18, 1997

[51] Int. Cl.$^6$ .......................... G11B 15/60; G11B 5/105; G11B 5/187
[52] U.S. Cl. .................. 360/130.21; 360/129; 360/122
[58] Field of Search .................. 360/122, 125, 360/128, 129, 130.2, 130.21

[56] References Cited

U.S. PATENT DOCUMENTS

| | | | |
|---|---|---|---|
| 4,123,791 | 10/1978 | Rotter et al. | 360/130 |
| 4,839,959 | 6/1989 | Mersing | 29/603 |
| 4,875,129 | 10/1989 | Favrou et al. | 360/122 |
| 4,888,657 | 12/1989 | Lacey et al. | 360/122 |
| 4,894,737 | 1/1990 | Hamana et al. | 360/129 |
| 4,949,208 | 8/1990 | Milo et al. | 360/122 |
| 5,003,423 | 3/1991 | Imamura et al. | 360/129 |
| 5,005,098 | 4/1991 | Kanada | 360/130.34 |
| 5,047,888 | 9/1991 | Mitsuhashi et al. | 360/130.34 |
| 5,063,469 | 11/1991 | Tandai | 360/128 |
| 5,138,509 | 8/1992 | Mitsuhashi | 360/130.34 |
| 5,202,808 | 4/1993 | Saito | 360/129 |
| 5,237,476 | 8/1993 | Bischoff et al. | 360/126 |
| 5,475,553 | 12/1995 | Saliba | 360/122 |
| 5,574,606 | 11/1996 | Kimura | 360/130.21 |
| 5,602,703 | 2/1997 | Moore et al. | 360/121 |

FOREIGN PATENT DOCUMENTS 8-022606   1/1996   Japan.

OTHER PUBLICATIONS

"Contoured Head Assembly for Use in a Cassette Loaded Recorder", Research Disclosure 30803, Dec. 1989, p. 903.

Primary Examiner—Jefferson Evans
Attorney, Agent, or Firm—John H. Holcombe

[57] ABSTRACT

Disclosed is a dimple magnetic recording head in a transducer assembly for linear tape drives. The dimple head has a flat transducing surface extending laterally a partial width of the magnetic recording tape. Two parallel tape support surfaces extend laterally the full width of the magnetic recording tape, positioned on either side of and spaced from the dimple head in the longitudinal direction of the magnetic recording tape. The tape support surfaces form a plane, and the dimple head flat transducing surface is parallel to the tape support surface plane and projects above the tape support surface plane to form tape wrap angles with respect to the tape support surfaces within a range of approximately ½ degree to 2.5 degrees. The dimple magnetic tape head is mass produced by lapping a row of transducers on a substrate to form a flat transducing surface. The row of substrate elements is then diced into separate substrate elements. The two parallel, spaced apart tape support surfaces are provided, and one of the diced substrate elements is mounted intermediate the tape support surfaces with the flat transducing surface exposed for forming a tape facing surface.

18 Claims, 9 Drawing Sheets

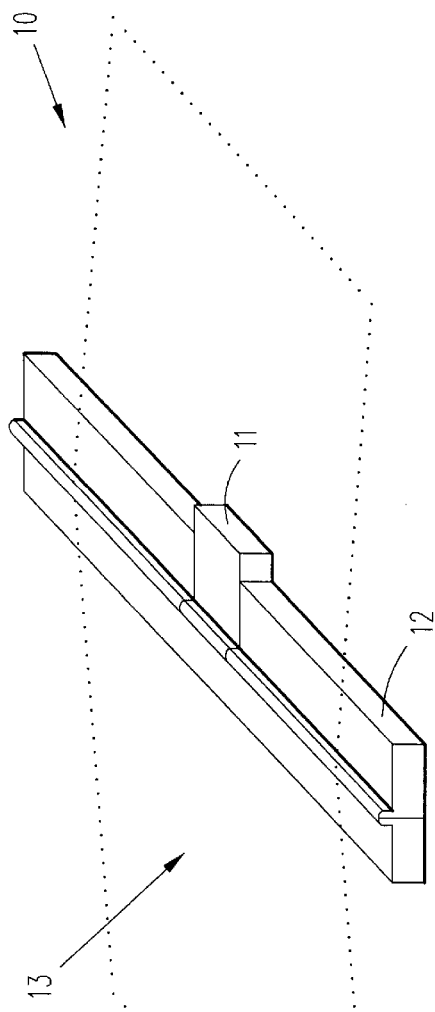
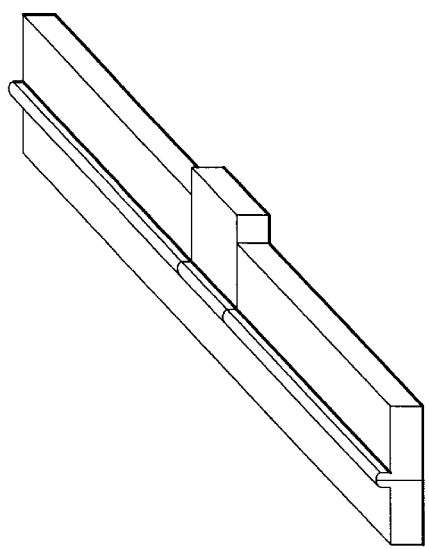
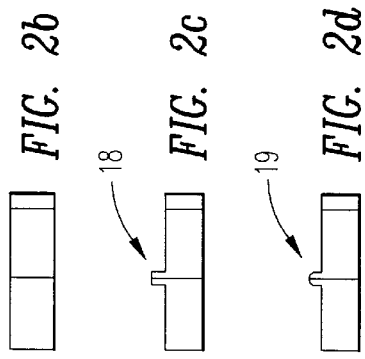
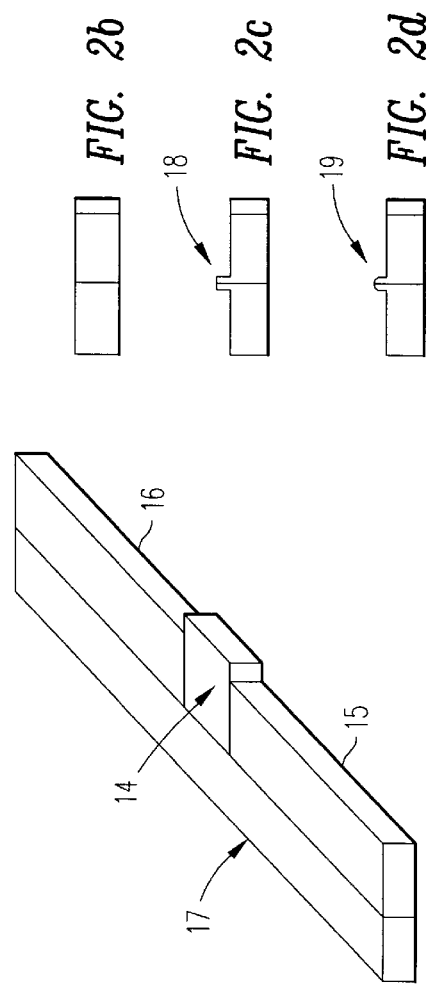
FIG. 1 (Prior Art)
FIG. 2a
FIG. 2b
FIG. 2c
FIG. 2d
FIG. 2e

PARTIAL WIDTH MASS PRODUCED LINEAR TAPE RECORDING HEAD

FIELD OF THE INVENTION

This invention relates to magnetic tape recording heads, and, more particularly, to tape heads that span only a portion of the width of the tape.

BACKGROUND OF THE INVENTION

Conventional recording heads for linear tape drives have small transducers incorporated into a large head assembly to span the full width of the tape. For recording heads fabricated using thin film wafer technology, this requires that the head either be fabricated individually on a wafer which is at least as wide as the recording tape and lapped individually to the proper shape, or be fabricated as a small part and assembled with larger pieces and the full assembly lapped individually to the proper shape.

The conventional shape of a tape head comprises a cylindrical or complex contour which is critical in maintaining the moving tape at the desired head to transducer spacing (called "contact" or "near contact" recording). The contact, or near contact, spacing is maintained by controlling the contour shape to "bleed", "skive" or "scrape" the boundary layer of air carried by the tape away before encountering the transducer to prevent the tape from "flying", or losing contact with the transducer.

The spacing between the magnetic head and the magnetic tape is crucial so that the recording gap of the transducer, which is the source of the magnetic recording flux, is in intimate or near contact with the tape to effect efficient signal transfer for recording. The spacing is also crucial so that the playback element is in intimate or near contact with the tape to provide effective coupling of the magnetic field from the tape to the playback element.

The full width of the tape in the prior art is contacted by the head assembly to prevent steering the moving tape as the head assembly is moved to access different data tracks. In addition, when a short span head is near an edge of the tape, the tape, without support, tends to lift from the head as the result of upward flex curvature as it travels over the protruding head. Thus, a wide head is used to provide support for the tape when the recording element is positioned near an edge of the tape. Even with full width support, there is an anticlastic bending effect that tends to lift the tape off the head near the edge of the tape.

FIG. 1 illustrates a conventional linear tape drive recording head 10. A small transducer 11 is incorporated into a large unit 12 to span the full width of the tape 13. FIG. 2 illustrates an example of one method of fabricating a conventional linear tape drive recording head of FIG. 1 using thin film wafer technology. In FIG. 2a, an individual chip 14 is assembled with wings 15 and 16 and closure 17 and glued together to form a full assembly which is shown in an end view in FIG. 2b. A portion of the top surface of the full assembly is then ground away to form the assembly shown in FIG. 2c, leaving a rooftop 18. The entire assembly is then individually lapped to the proper depth so as to attain the final stripe and throat heights for the magnetic transducer and to attain the desired contour 19 as shown in FIG. 2d. The resultant assembly is illustrated in FIG. 2e.

The conventional shape of FIG. 2 comprises a cylindrical or complex contour which is critical in maintaining the moving tape in contact with the transducer, as described above. The full width contour of FIGS. 1 and 2 serves three purposes. 1) It prevents tape steering as the recording element is moved to access different data tracks. 2) It provides support for the tape as the head is positioned near the edge of the tape 13. And 3) It prevents the edges of the chip 14 from damaging the tape. 13.

The contour of the head must also allow a low tension on the tape so as to not distort the tape. Typically, the contour is designed with a small radius 19 in FIG. 2d so the pressure on the head, which is proportional to the tape tension per unit width divided by the radius (T/wR), is high with tensions low enough not to excessively distort the tape. However, the contour of the head must be such that the pressure of the tape on the transducer is not so high that the surface of the transducer wears excessively.

Such full width heads are often provided with "outriggers" to maintain a small wrap angle over the recording elements of the head even though the wrap angle over the outriggers can change with different cartridges inserted into the tape drive. A change in wrap angle over the portion of the head containing the recording elements can lead to air entrainment and excessive flying height of the tape.

Like the head assembly, the outriggers must also be the full width of the tape in order to prevent distortion of the tape. Often, the outriggers must also be lapped to a contour which is coordinated with the contour of the head assembly.

Individual lapping of the tape head assembly and of the corresponding outriggers, especially to a contour, is very expensive and is a major contributor to the manufacturing cost of the tape head.

Partial span recording heads are used in helical scan tape recording and in floppy disks. They are individually assembled and then provided with a spherical or elliptical contour. Such heads have not been used in linear tape recorders due to the need for tape edge support and a requirement for substantial tape tension or contact pressure to maintain contact with the head. In addition, it is difficult to provide such a contour when a multiplicity of recording elements are required in the head.

U.S. Pat. No. 4,123,791, Rotter et al., describes a single element narrow tape head positioned between outrigger bars of 0.25 inch radius with radial centers 0.4 inch apart. An additional pair of stub outriggers aligned in the direction of tape travel, having the same shape as the head and spaced 25 to 30 mils on either side of the head, were required to support the edge of the tape. The narrow tape head and stub outriggers were required to allow the splitting and passage of the boundary layer of air.

SUMMARY OF THE INVENTION

An object of the present invention is to provide a tape head that does not require expensive contouring or complex assembly with stub outriggers.

Another object of the present invention is to provide a tape head which attains optimum spacing with respect to the tape at all track positions across the width of tape.

Disclosed is a dimple magnetic recording head in a transducer assembly for linear tape drives. The dimple head has a flat transducing surface extending laterally a partial width of the magnetic recording tape. Two parallel tape support surfaces extend laterally the full width of the magnetic recording tape, positioned on either side of and spaced from the dimple head in the longitudinal direction of the magnetic recording tape. In addition, the anticlastic lift off of the tape near its edges is minimized with present tape thickness (approx. 9 microns) and tension for a dimple head length of 0.6 to 1 mm in the tape moving direction. Further miminization can be achieved by providing a slight contour on the edges of the dimple head. The tape support surfaces form a plane, and the dimple head flat transducing surface is parallel to the tape support surface plane and projects above the tape support surface plane to form tape wrap angles with respect to the tape support surfaces of approximately ½ degree to 2.5 degrees. The low wrap angle helps prevent tape steering as the head is moved to access different data tracks. The high end of the range (2.0 to 2.5 degrees) of wrap angle allows reading and writing nearer the edge of the tape at the expense of increased tape steering.

A method for forming a dimple magnetic tape head is disclosed. A plurality of transducers are formed on a common row of substrate elements, and the common row of substrate elements is lapped to achieve the proper throat height of the inductive write elements (approx ½ to 3 microns), appropriate magnetoresistive stripe height of the magnetoresistive read elements (approx ½ to 3 microns), and a flat transducing surface. This is the most critical and expensive lapping step in forming tape heads. With this disclosure a plurality of recording heads are lapped in a single rowbar in a single step thus reducing cost. The rowbar is subsequently diced into separate recording heads, each of which may contain a multiplicity of recording elements. The two parallel, spaced apart tape support surfaces are provided, and one of the diced substrate elements is mounted intermediate the tape support surfaces with the flat transducing surface exposed for forming a tape facing surface.

Other objects, features, and advantages of the present invention will be apparent from the accompanying drawings and from the detailed description below.

BRIEF DESCRIPTION OF THE DRAWINGS

The present invention is illustrated by way of example and not limitation in the figures by the accompanying drawings in which like references indicate similar elements and in which:

FIG. 1 is a perspective illustration of a linear tape head assembly of the prior art;

FIGS. 2a through 2e are illustrations of the method for producing the prior art linear tape head assembly of FIG. 1;

DETAILED DESCRIPTION OF THE INVENTION

Figure 3:
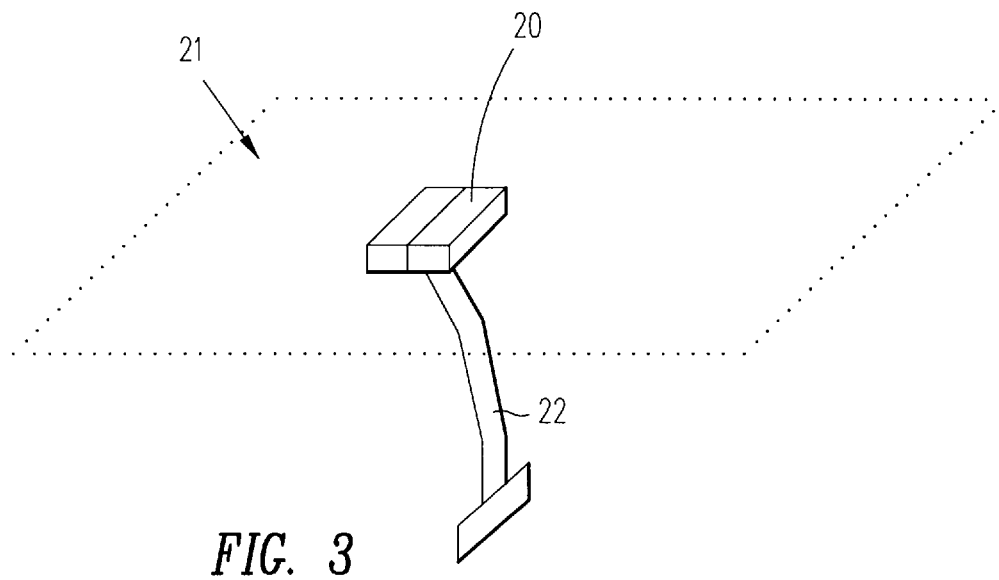
FIG. 3 is a perspective illustration of an embodiment of the linear tape head of the present invention.

FIG. 3 illustrates an embodiment of the partial span tape head 20 of the present invention. Tape head 20 is a partial span flat head, called a "dimple" head, because the recording elements are located about centered in a flat carrier. The head can be batch fabricated by stripe and throat height lapping then diced and assembled into carriers to provide completed heads. A row of heads is lapped to achieve the proper throat height of the inductive write elements (approx ½ to 3 microns), appropriate magnetoresistive stripe height of the magnetoresistive read elements (approx ½ to 3 microns), and a flat transducing surface. This is the most critical and expensive lapping step in forming tape heads. With this disclosure a plurality of recording heads are lapped in a single rowbar in a single step thus reducing cost. The rowbar is subsequently diced into separate recording heads, each of which may contain a multiplicity of recording elements.

The head 20 slightly penetrates the plane of the tape 21 to provide a small wrap angle for scraping the air off as it goes by the sharp edge. Cable 22 connects the dimple tape head 20 to the read/write channel of an associated tape drive.

Dimple tape head 20 works properly over only a small range of wrap angles. For one embodiment, the range of wrap angle is from about ½ degree to 2.5 degrees.

Because of the very small wrap angle, the head does very little tape steering as it moves from one side of the tape 21 to the other to access the recording tracks. In addition, the anticlastic liftoff of the tape near its edges is minimized with present tape thickness (approx. 9 microns) and tension for a dimple head length of 0.6 to 1 mm in the tape moving direction. Further minimization can be acheived by providing a slight contour on the edges of the dimple head.

Figure 4:
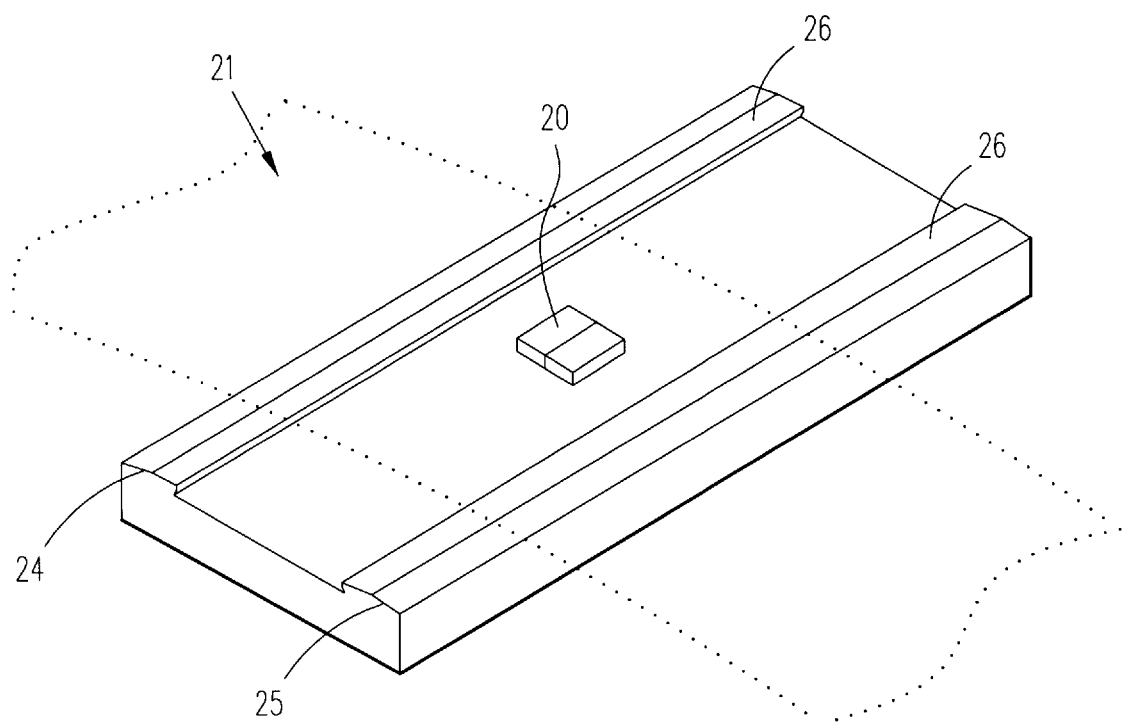
FIG. 4 is a perspective illustration of an embodiment of the linear tape head assembly of the present invention.

FIG. 4 illustrates one embodiment of the tape head assembly which includes linear dimple tape head 20 with outriggers 24 and 25. Outriggers 24 and 25 maintain the proper wrap angle and prevent tape steering by extending the full width of the tape 21.

For one embodiment, a wrap angle between about ½ degree and 2.5 degrees is adequate to scrape the air off the tape and to provide the desired spacing between the tape and the transducer elements in the dimple head. Surfaces 26 of the outriggers 24 and 25 provide a convenient means of controlling the wrap angle.

Figure 5:
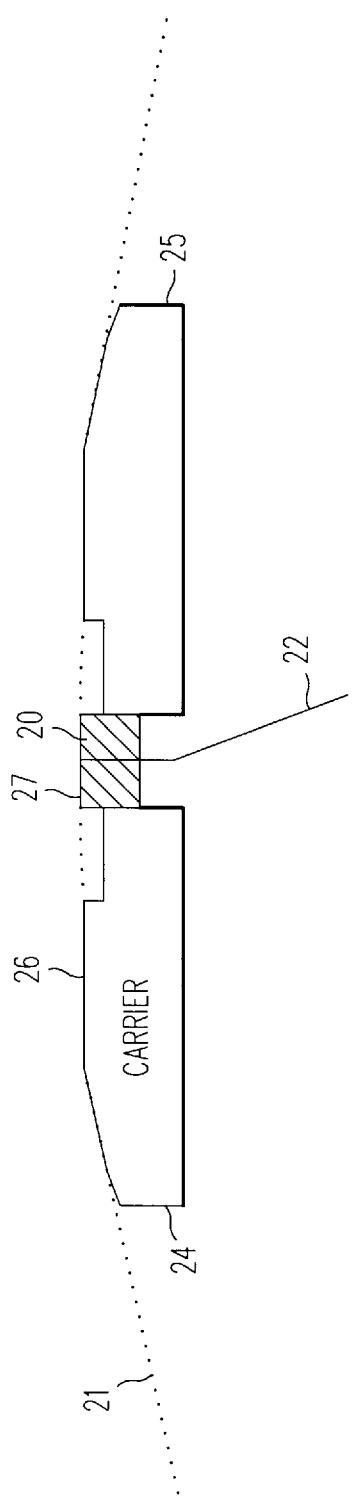
FIG. 5 is an illustration of a cross section of the linear tape head assembly of FIG. 4.

FIG. 5 is a cross sectional view of the linear dimple tape head assembly of FIG. 4. For one embodiment, the size of the wrap angle may be precisely controlled by lapping flat surfaces 26 of the outriggers 24 and 25 to a precise dimension in a common plane, and then mounting the dimple head 20 in a plane parallel to the plane formed by the surfaces 26 at a precise height with respect to the plane formed by the flat surfaces 26. In a preferred embodiment, a penetration of the flat surface 27 of dimple head 20 above the plane of the flat outrigger surfaces 26 of the order of 0.001 inch (1 mil) is adequate to obtain the desired wrap angle and transducer to tape spacing.

Figure 6:
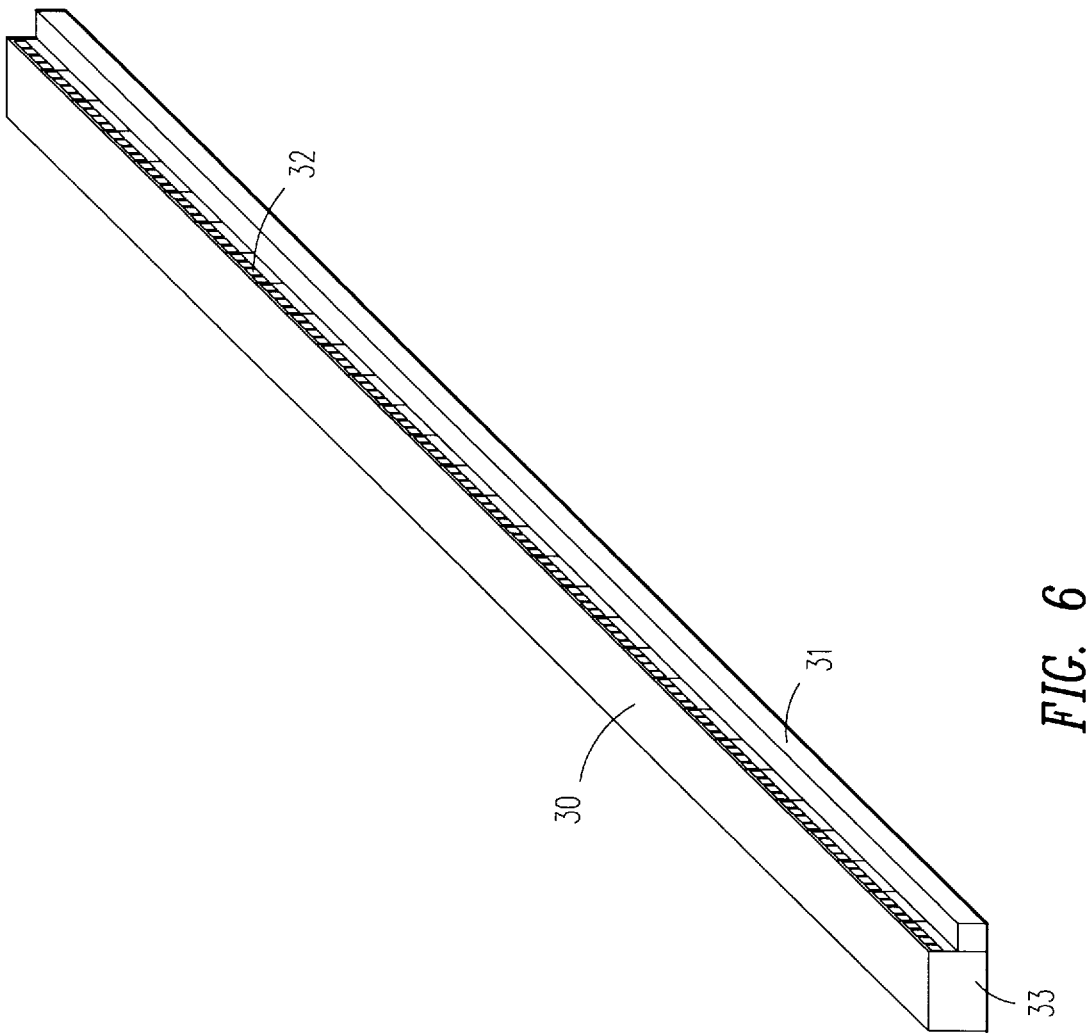
FIG. 6 is a perspective illustration of a row of substrate elements with transducers.

FIG. 6 illustrates a row 30, or rowbar, cut from a substrate or wafer along with a closure 31. The transducers are mass produced using conventional etching and deposition techniques. The row 30 is typically formed on a ceramic substrate which is either magnetic, such as ferrite, or nonmagnetic such as Alumina-Titanium-Carbide depending on the design. The write and read heads are formed on the substrate using convention thin film deposition, etching, and lithographic techniques. Both the inductive write elements and magnetoresistive read elements are provided with connection terminal 32. Closure 31 is provided to protect the thin film read and write elements from being damaged by the tape and to form part of the flat transducing surface. As illustrated in FIG. 6, underside surface 33 of the row 30 and closure 31 is the transducing surface and is lapped to achieve the final throat and stripe heights of the transducers.

Figure 7:
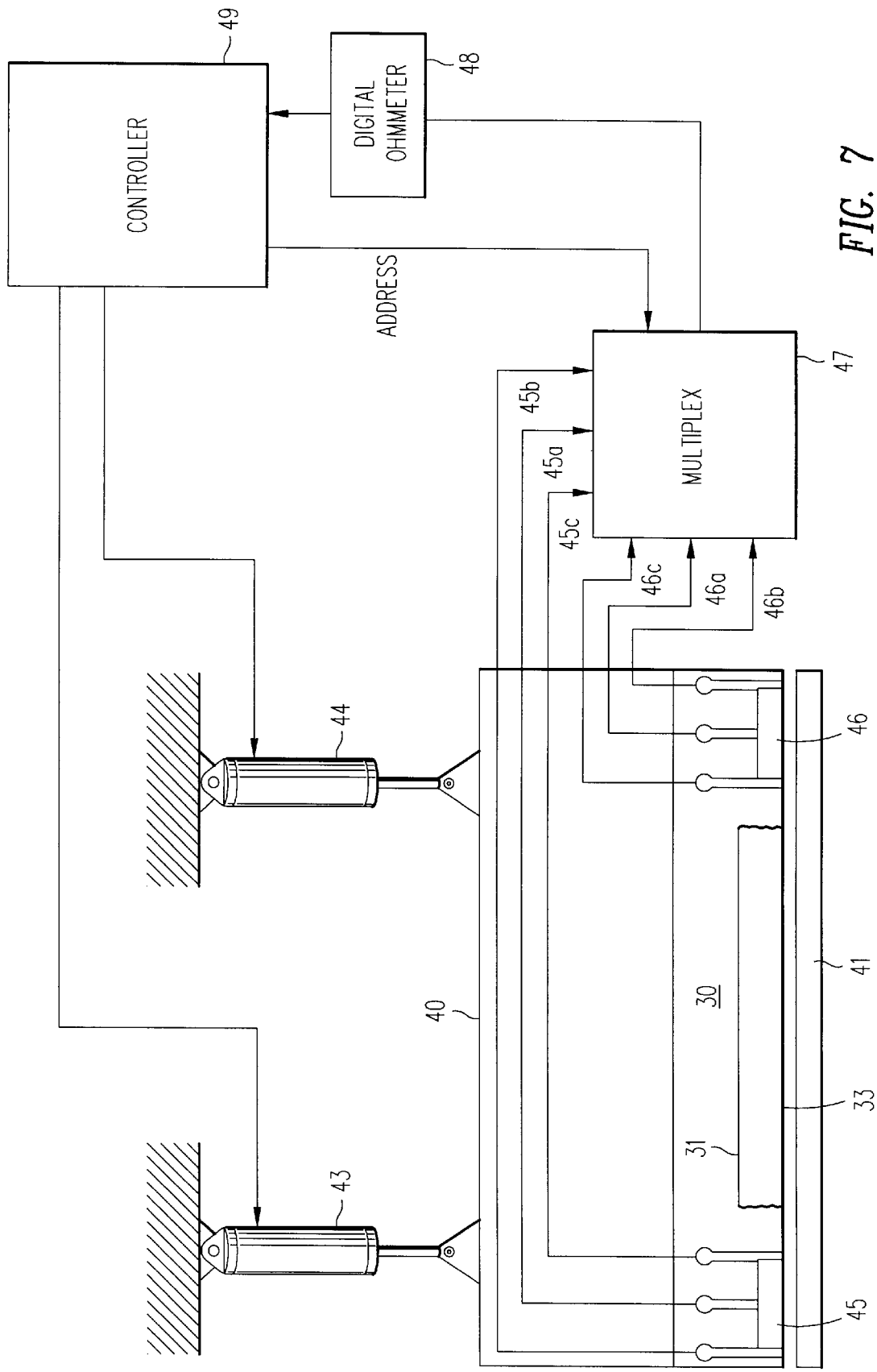
FIG. 7 is a diagrammatic illustration of a lapping system for lapping the common row of substrate elements of FIG. 6.

A typical lapping system for lapping flat transducing surface 33 of common row 30 is illustrated in FIG. 7. A lapping fixture 40 holds the common row 30 of substrate elements in position over a lapping plate 41. Lapping plate 41 is a flat abrasive surface for accurately lapping surface 33 to a final dimension.

The force applied to lapping fixture 40 is derived from first and second pressure actuators 43 and 44. Varying the force applied by the actuators 43 and 44 against substrate row 30 controls leveling of the lapped surface 33.

The lapping device insures thereby insuring that the throat heights and stripe heights for all of the transducers are at the same length.

After completion of lapping of row transducer surface 33, row 30 is diced or partitioned into separate dimple heads. The mass production of the dimple heads as described above substantially reduces the cost of providing lapped heads, as compared to the individual lapping required by the prior art.

Figure 8:
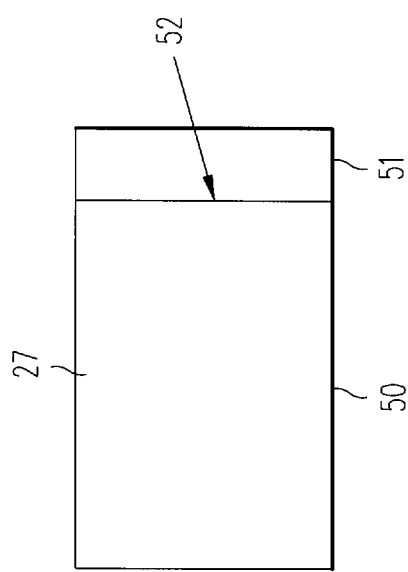
FIG. 8 is a top view illustration of a substrate element diced from the common row of FIG. 6.

A single dimple head is illustrated in FIG. 8. Substrate 50, closure 51 and gap 52 form flat transducing surface 27 of the dimple head. In a preferred embodiment, a plurality of read and write elements are contained in gap 52.

Figure 9A:
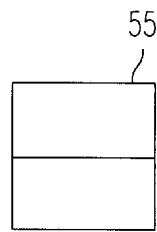
FIGS. 9a, 9b and 9c are top view illustrations of alternative embodiments of substrate elements of the present invention.
Figure 9B:
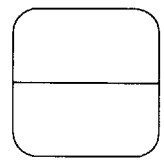
Figure 9C:
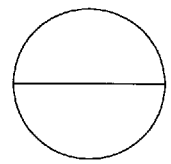

FIGS. 9a–c illustrate alternative embodiments of the dimple head. FIG. 9a shows a square head embodiment with sharp corners 55. Although the sharp corners 55 may be effective in scraping the boundary layer of air from the tape, the tape exerts its greatest pressure on the corners. FIG. 9b shows a dimple head with rounded corners, called "edge blend", to minimize edge pressure when used with a carrier like that of FIG. 4. The corners are rounded after the head has been diced from the common row.

Figure 10:
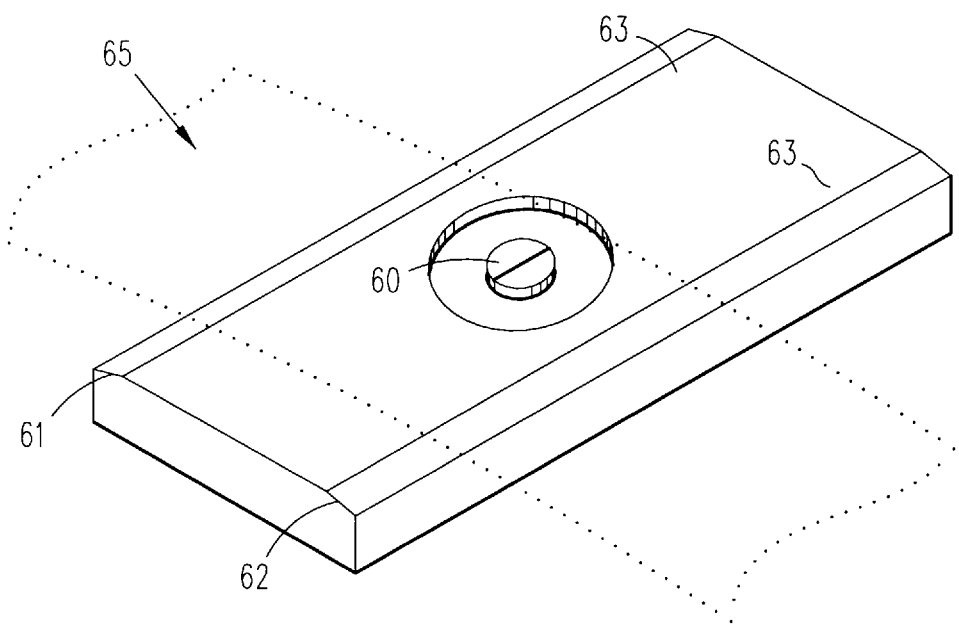
FIG. 10 is a perspective illustration of an alternative embodiment of a linear tape head assembly of the present invention.

FIG. 9c shows a round configuration which reduces the edge pressure when used with the carrier of FIG. 10. Other shapes, such as those of FIGS. 9a and 9b may also be used. The dimple head 60 is still flat, but is circular in the other dimension. The dimple head is rounded after the head has been diced from the row. Outriggers 61 and 62 are joined by flat surfaces 63, and the head is placed in a circular cutout so as to protrude slightly so that tape 65 forms a wrap angle of between approximately ½ degree and 2.5 degrees with respect to the edges formed by outriggers 61 and 62 with flat surface 63. Outrigger flat surface 63 may be lapped or ground to a common plane.

Figure 11:
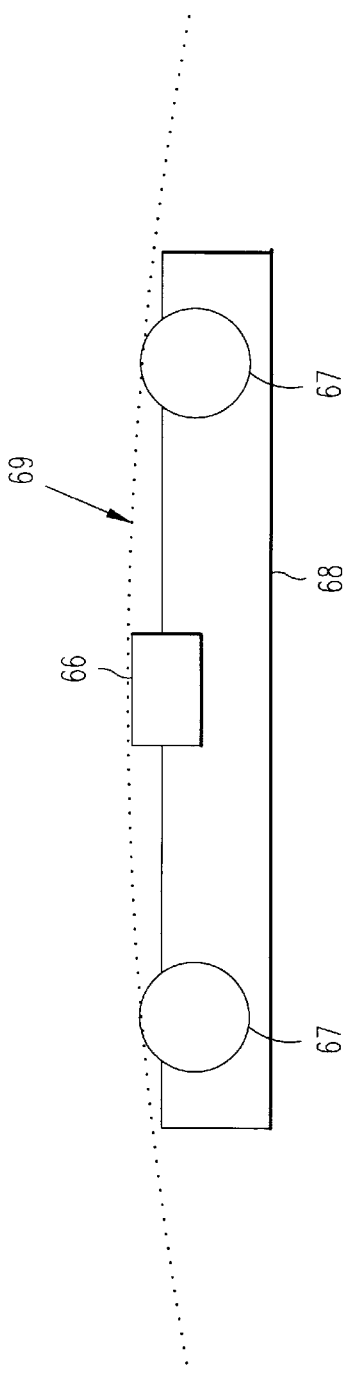
FIG. 11 is an illustration of a cross section of another alternative embodiment of a linear tape head assembly of the present invention.

FIG. 11 illustrates an alternative embodiment of the present invention having a dimple head 66 and outrigger dowels 67 mounted in a carrier 68. The dimple head 66 is mounted so as to protrude slightly above the outrigger dowels 67 and 68 and penetrate into tape 69 sufficiently to form a wrap angle of between approximately ½ degree and 2.5 degrees.

Figure 12:
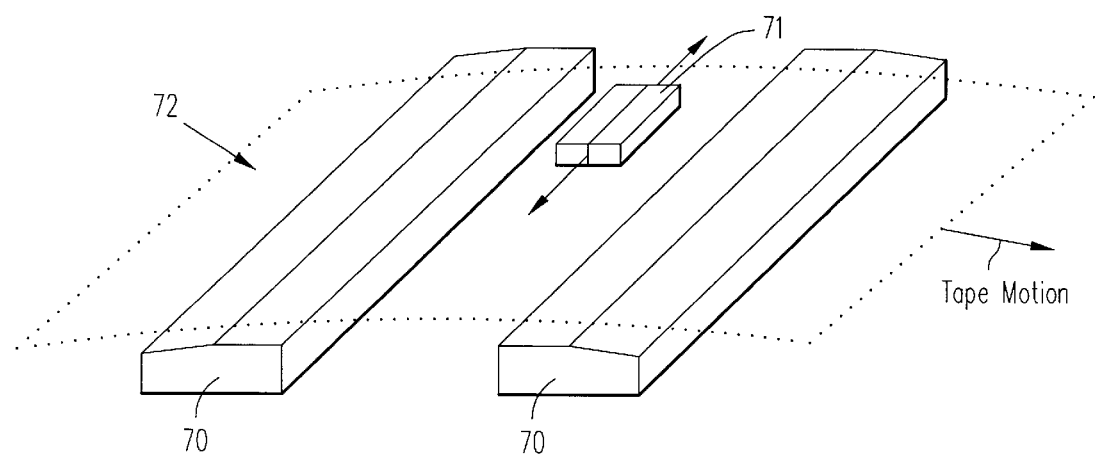
FIG. 12 is a perspective illustration of a movable head embodiment of the linear tape head assembly of the present invention.

FIG. 12 illustrates an alternative embodiment of a linear tape head assembly of the present invention having a fixed set of outriggers 70 and a moveable head 71. The outriggers 70 extend the full width of tape 72, while head 71 moves in the lateral direction between tracks.

Figure 13:
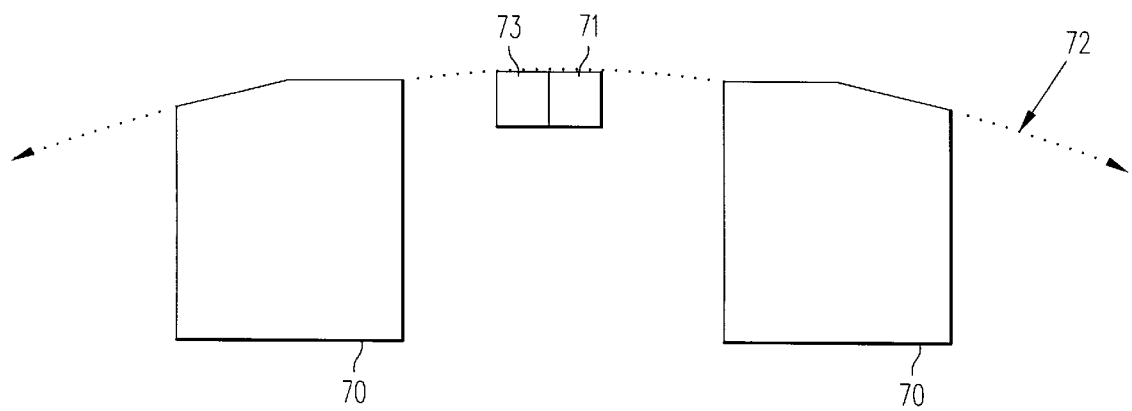
FIG. 13 is an illustration of a cross section of the linear tape head assembly of FIG. 12.

FIG. 13 is a cross section view of the linear tape head assembly of FIG. 12, illustrating the slight penetration of the head 71 into the tape 72 above outriggers 70. The slight penetration by head 71 provides a wrap angle of tape 72 of between about ½ degree and 2.5 degrees. The outriggers 70 maintain the proper wrap angle and prevent tape steering by the movement of the head 71. Single recording gap 73 is provided in head 71, which may include a multiplicity of transducers.

Figure 14:
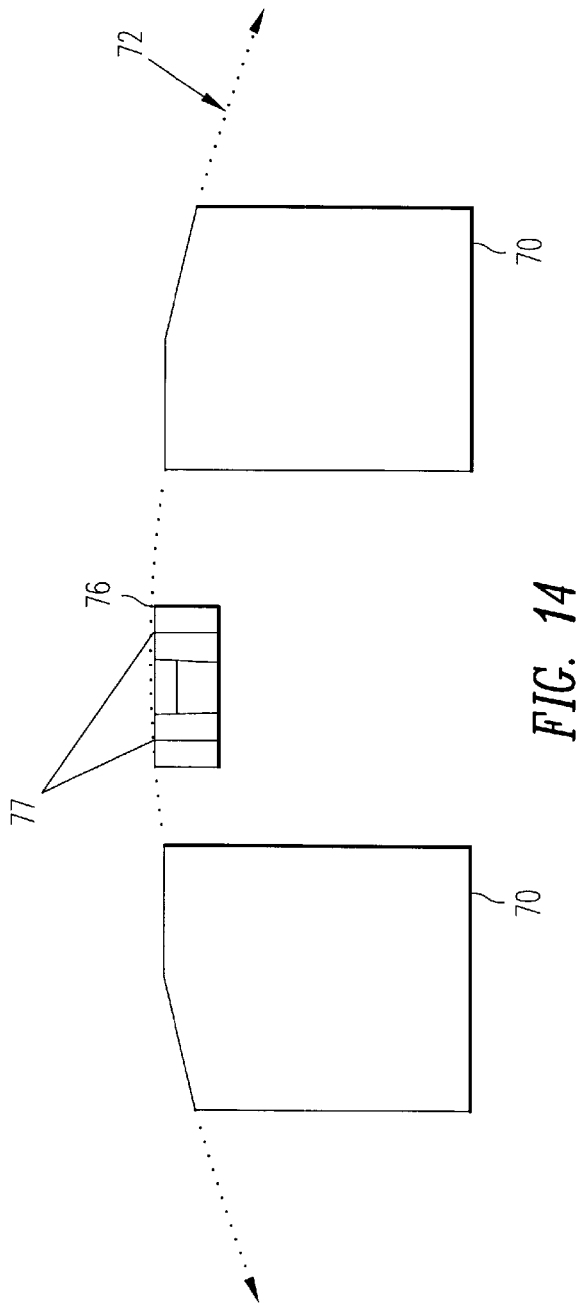
FIG. 14 is an illustration of a cross section of an alternative embodiment of the linear tape head assembly of FIG. 12.

FIG. 14 illustrates a moveable read after write head 76 having dual recording gaps. Head 76 comprises two heads 71 whose flat transducing surfaces 77 slope down from the center ½ to 1 degree each. The wrap angle of tape 72 is provided by outriggers 70 in the range between about ½ degree and 2.5 degrees with respect to each side of the head 76. Read after write head 76 may also be employed in any of the embodiments of the invention.

Figure 15:
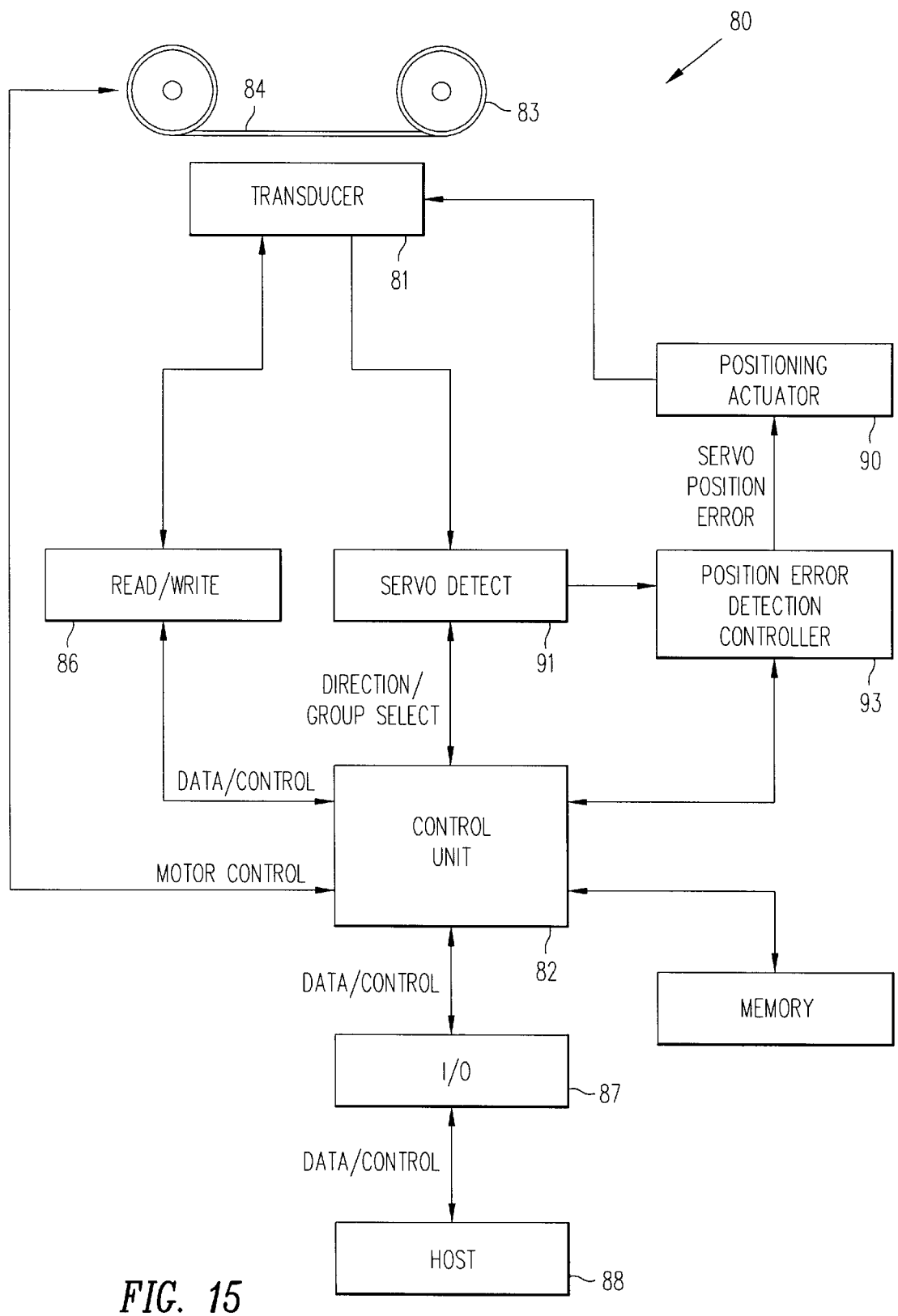
FIG. 15 is a diagrammatic illustration of a tape drive which may incorporate the linear tape head assembly of the present invention.

FIG. 15 illustrates an embodiment of a tape drive 80 incorporating dimple head assembly 81. A tape drive control unit 82 provides a motor control signal to rotate tape reels 83 and move tape 84 across the dimple head assembly 81. Read/write channel 86 amplifies, decodes or encodes, and transmits read signals from the dimple head and/or write signals to the dimple head with respect to control unit 82. The data is communicated through I/O channel 87 with host 88. Lateral repositioning of the dimple head assembly 81 with respect to the tape 84 is accomplished by positioning actuator 90. The lateral repositioning is required to access the various tracks of the tape 84 with the dimple head 81. A servo system may be employed for accurate lateral repositioning of the head assembly 81. An exemplary servo system includes a servo detector 91 to detect both the track that the head is currently on and whether the head is off center. Control unit 82 indicates the track address of a desired new track to position error detection controller 93 for repositioning the head. Servo detector 91 indicates the current track to position error detection controller 93, and the controller provides a servo position error signal to positioning actuator 90 which repositions the dimple head assembly 81 to the new track. The servo system also provides track following signals to positioning actuator 90 so that the tracks on tape 84 may be closely spaced.

Alternatively, positioning actuator 90 may comprise a stepping motor which repositions the dimple head assembly 81 between fixed positions. These and other repositioning means are within the skill of those skilled in the art.

Outriggers of the dimple head assembly 81 support the tape 84 in all lateral positions of the dimple head transducer across the tape and maintain the wrap angle of the tape with respect to the dimple head.

While the preferred embodiments of the present invention have been illustrated in detail, it should be apparent that modifications and adaptations to those embodiments may occur to one skilled in the art without departing from the scope of the present invention as set forth in the following claims.

We claim:

1. A magnetic tape head assembly for use with a magnetic recording tape passing thereover, comprising:

a magnetic head having a flat transducing surface extending laterally a partial width of a magnetic recording tape; and a plurality of outrigger tape support surfaces, each extending laterally the full width of a magnetic recording tape, on either side of and spaced from said magnetic head in the longitudinal direction of a magnetic recording tape, each said outrigger tape support surface having a portion parallel in said lateral direction to said magnetic head flat transducing surface.

2. The magnetic tape head assembly of claim 1, wherein said outrigger tape support surfaces form a plane; and said magnetic head flat transducing surface is parallel to said outrigger plane and projects above said outrigger plane to form tape wrap angles with respect to said outrigger tape support surfaces within the range of approximately ½ degree to 2.5 degrees.

3. The magnetic tape head assembly of claim 2, movable laterally to move said magnetic transducing head laterally across the width of a magnetic recording tape, wherein said outrigger tape support surfaces extend laterally the full width of a tape for all positions of said magnetic transducing head across a tape.

4. The magnetic tape head assembly of claim 1, wherein said outrigger tape support surfaces are flat, planar, rectangular surfaces.

5. The magnetic tape head assembly of claim 1, wherein said magnetic head flat transducing surface is a lapped surface.

6. The magnetic tape head assembly of claim 5, wherein said tape support surfaces form a plane; and said magnetic head flat transducing surface is parallel to said tape support surface plane and projects above said tape support surface plane to form tape wrap angles with respect to said tape support surfaces within the range of approximately ½ degree to 2.5 degrees.

7. The magnetic tape head assembly of claim 5, wherein said tape support outriggers are stationary and said magnetic head is moveable in said lateral direction.

8. The magnetic tape head assembly of claim 1, wherein said magnetic head comprises two flat transducing surfaces positioned adjacent each other in said longitudinal direction, forming a center junction, and sloped down from said center junction from a plane perpendicular to said center junction between approximately ½ degree to 1 degree each.

9. A magnetic tape drive for use with a magnetic recording tape, comprising:

a tape reel drive system for moving a magnetic recording tape linearly;

a dimple head having at least one magnetic transducing head and having a flat transducing surface extending laterally a partial width of a magnetic recording tape; and a plurality of outrigger tape support surfaces, each extending laterally the full width of a magnetic recording tape, on either side of and spaced from said dimple head in the longitudinal direction of a magnetic recording tape, each said outrigger tape support surface having a portion parallel in said lateral direction to said dimple head flat transducing surface.

10. The magnetic tape drive of claim 9, wherein said outrigger tape support surfaces form a plane; and said dimple head flat transducing surface is parallel to said outrigger plane and projects above said outrigger plane to form tape wrap angles with respect to said outrigger tape support surfaces within the range of approximately ½ degree to 2.5 degrees.

11. The magnetic tape drive of claim 10, additionally comprising a positioning system for moving said magnetic transducing head laterally across the width of a magnetic recording tape, and wherein said outrigger tape support surfaces extend laterally the full width of a tape for all positions of said magnetic transducing head across a tape.

12. The magnetic tape drive of claim 9, wherein said outrigger tape support surfaces are flat, planar, rectangular surfaces.

13. The magnetic tape drive of claim 9, wherein said dimple head flat transducing surface is rectangular in shape.

14. The magnetic tape drive of claim 13, wherein said rectangular dimple head flat transducing surface has rounded corners.

15. The magnetic tape drive of claim 9, wherein said dimple head flat transducing surface is square in shape.

16. The magnetic tape drive of claim 9, wherein said dimple head flat transducing surface is a lapped surface.

17. The magnetic tape drive of claim 9, wherein said tape support outriggers are stationary and said magnetic head is moveable in said lateral direction.

18. The magnetic tape drive of claim 9, wherein said magnetic head comprises two flat transducing surfaces positioned adjacent each other in said longitudinal direction, forming a center junction, and sloped down from said center junction from a plane perpendicular to said center junction between approximately degree to 1 degree each.

* * * * *